W. R. GARDNER.
NUT LOCK.
APPLICATION FILED NOV. 16, 1909.
966,004.
Patented Aug. 2, 1910.
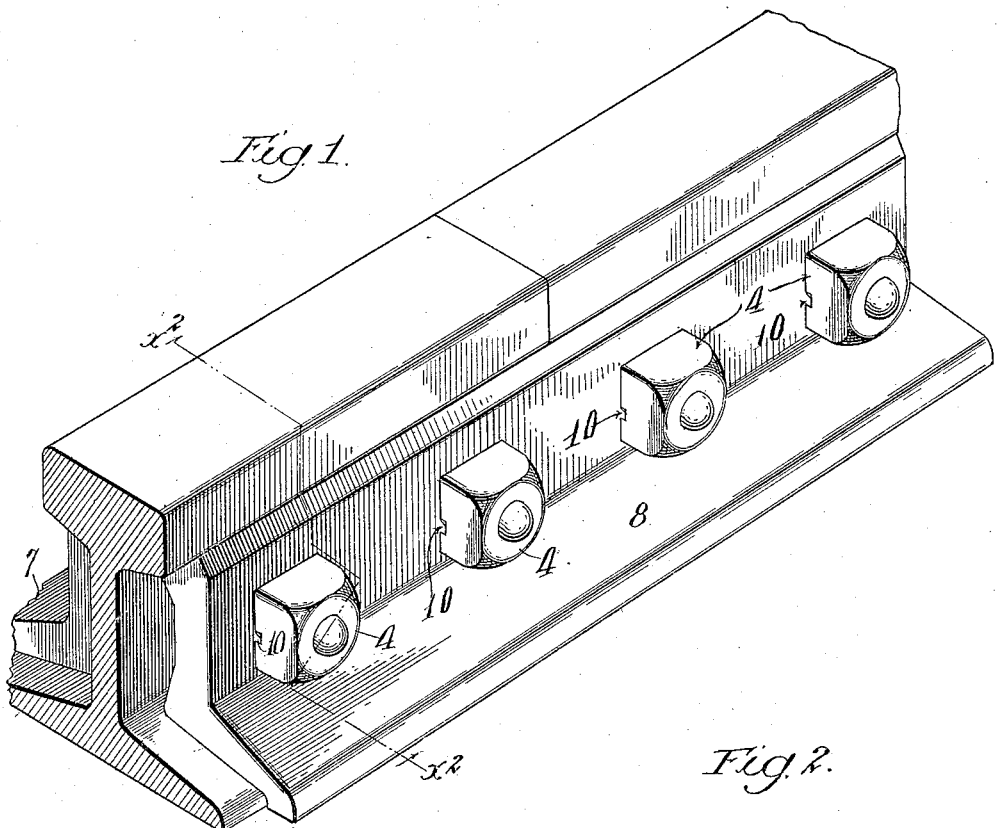
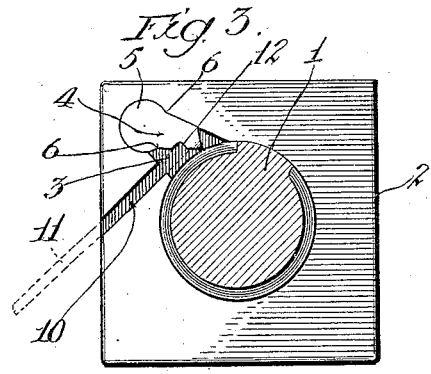
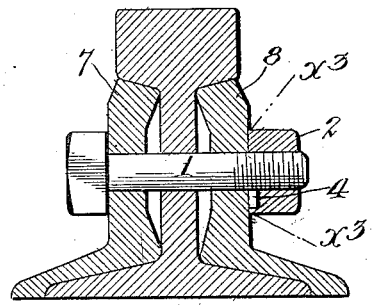
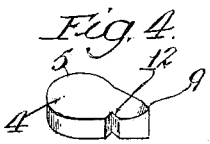
Witnesses:
Inventor:
William R. Gardner,
by Townsend, Lyon & Hackley,
his Attys.

UNITED STATES PATENT OFFICE.

WILLIAM R. GARDNER, OF LOS ANGELES, CALIFORNIA, ASSIGNOR TO GARDNER'S LOCK NUT COMPANY, OF LOS ANGELES, CALIFORNIA, A CORPORATION OF CALIFORNIA.

NUT-LOCK.

966,004.  Specification of Letters Patent.  Patented Aug. 2, 1910.

Application filed November 16, 1909. Serial No. 528,409.

*To all whom it may concern:*

Be it known that I, WILLIAM R. GARDNER, a citizen of the United States, residing at Los Angeles, in the county of Los Angeles and State of California, have invented new and useful Improvements in Nut-Locks, of which the following is a specification.

This invention relates to nut locks and consists in an improvement on a previous application of mine, filed October 25, 1909, Serial No. 524,563, wherein is shown a nut lock which will permit a nut to be readily turned up on the bolt, but which will prevent the nut from unscrewing on the bolt, and the particular object of the present invention is to provide means whereby, when it is desired to unscrew the bolt, that such may be accomplished, although the bolt is securely locked from accidentally unscrewing.

Referring to the drawings: Figure 1 is a perspective view of a rail joint with fish plates showing one of the applications for which the invention is particularly designed. Fig. 2 is a cross section on line $x^2$—$x^2$ Fig. 1. Fig. 3 is an enlarged cross section on line $x^3$—$x^3$ Fig. 2. Fig. 4 is a perspective view of the dog.

1 designates the threaded bolt.

2 designates the nut having a recess 3 arranged tangentially and widening toward the point where it opens into the center of the nut. Within the recess 3 is a dog 4 having a hub 5 which is retained in the recess 3, the latter having shoulders 6. The recess 3 is formed on the inner side of the nut, that is, on the side of the nut which comes in contact with the shoulder against which the nut is screwed. For example, in Fig. 2, fish plates 7 and 8 are shown, the nut 2 bearing against the fish plate 8 and the recess 3 lying on that side of the nut which bears against the fish plate 8. The length of the dog 4 is such that when the nut turns reversely, the edge of the dog will grip in the threads of the bolt 1 and thus act as a pawl or detent to prevent the nut from unscrewing. In order to insure that the edge of the dog will be caused to bite into the edge of the threads one side of the dog is formed with a projection 9 which bears against the piece 8, so that when the nut commences to unscrew, the frictional contact between the projection 9 and the fish plate 8 retards the end of the dog 4 and causes its edge to bite into the threads of the bolt. This frictional engagement of the projection 9 is of great importance in this invention. This frictional engagement, however, does not prevent the nut from being screwed onto the bolt because in such movement it has a reverse action on the pawl tending to throw it away from contact with the bolt.

The foregoing is a brief description of the device to which the present improvement relates. The improvement which forms the subject matter of the present invention consists in forming a groove 10 in the inner side of the nut extending from the edge of the nut into the recess 3, as clearly shown in Fig. 3, through which groove a wire, rod, or any suitable instrument, 11 may be easily inserted to press against the dog 4 and push the latter back from engagement with the bolt 1, such instrument being indicated by dotted lines in Fig. 3. In order to give the rod 11 a good footing on the dog 4, the latter is formed with a shoulder 12 against which the end of the rod 11 may pass and which will prevent the rod from slipping.

What I claim is:

A nut lock comprising a nut formed with a recess, a rocking pawl mounted in the recess and having a projection adjacent its operating end which extends beyond the face of the nut, the projection frictionally engaging the surface of the material with which the nut contacts when in use, thereby causing the pawl to rock and the operating end to grip the periphery of a bolt when the nut is reversely turned on said bolt, the said nut having a groove extending from the recess to the outer end of the nut to permit the insertion of a rod to prevent the pawl rocking and hold its operating end from engagement with the threads when removing the nut.

In testimony whereof, I have hereunto set my hand at Los Angeles, California, this 10th day of November, 1909.

WILLIAM R. GARDNER.

In presence of—
P. H. SHELTON,
FRANK L. A. GRAHAM.